United States Patent
Takayanagi et al.

(10) Patent No.: US 8,460,625 B2
(45) Date of Patent: Jun. 11, 2013

(54) EXHAUST GAS PURIFICATION APPARATUS AND METHOD FOR ENGINE AND FILTER REGENERATION SYSTEM OF THE EXHAUST GAS PURIFICATION APPARATUS

(75) Inventors: Ko Takayanagi, Tokyo (JP); Keisuke Okuda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/519,738

(22) PCT Filed: Jan. 26, 2011

(86) PCT No.: PCT/JP2011/051511
§ 371 (c)(1),
(2), (4) Date: Jul. 30, 2012

(87) PCT Pub. No.: WO2011/099366
PCT Pub. Date: Aug. 18, 2011

(65) Prior Publication Data
US 2012/0282159 A1 Nov. 8, 2012

(30) Foreign Application Priority Data
Feb. 9, 2010 (JP) ................................. 2010-026439

(51) Int. Cl.
| | | |
|---|---|---|
| B01D 29/62 | (2006.01) | |
| B01D 53/92 | (2006.01) | |
| B01D 53/94 | (2006.01) | |
| F01N 3/023 | (2006.01) | |
| F01N 3/025 | (2006.01) | |
| G05D 7/00 | (2006.01) | |
| G05D 23/00 | (2006.01) | |

(52) U.S. Cl.
USPC .............. 423/212; 423/212.5; 423/DIG. 5; 422/105; 422/107; 95/278; 95/283; 60/274; 60/277; 60/297; 60/299; 60/311

(58) Field of Classification Search
USPC .............. 423/212, 215.5, DIG. 5; 422/105, 422/107; 95/278, 283; 60/274, 277, 297, 60/299, 311
See application file for complete search history.

(56) References Cited

U.S. PATENT DOCUMENTS
7,611,567 B2 * 11/2009 Chiba et al. .................... 95/278
2005/0044845 A1 * 3/2005 Onodera et al. ................ 60/286
(Continued)

FOREIGN PATENT DOCUMENTS
EP   1 722 082 A2   11/2006
JP   2000-38917   2/2000
(Continued)

OTHER PUBLICATIONS
International Preliminary Report on Patentability and Written Opinion of the International Searching Authority issued Sep. 18, 2012 in corresponding International Application No. PCT/JP2011/051511 (with English translation).
(Continued)

Primary Examiner — Timothy Vanoy
(74) Attorney, Agent, or Firm — Wenderoth, Lind & Ponack, L.L.P.

(57) ABSTRACT

An exhaust gas purification apparatus for an engine is provided with a filter arranged in an exhaust passage of the engine, and a regeneration control unit for regenerating the filter by burning the particulate matters accumulated in the filter. The control unit may include an over-accumulation state determination unit and a switch. The over-accumulation state determination unit determines over-accumulation of the particulate filter in the filter when the particulate matter is over-accumulated in the filter. The switch switches a regeneration temperature for regenerating the filter between a first regeneration temperature at which a normal regeneration is performed and a second regeneration temperature which is lower than the first regeneration temperature. The control unit is connectable to a command unit when the particular matter is over-accumulated in the filter, so that the switch is forcibly operated toward the second regeneration temperature.

17 Claims, 8 Drawing Sheets

U.S. PATENT DOCUMENTS

2007/0261392 A1 11/2007 Wirth et al.
2009/0235644 A1 9/2009 Wu et al.
2012/0288410 A1* 11/2012 Takayanagi .................. 422/105

FOREIGN PATENT DOCUMENTS

| JP | 2005-113752 | 4/2005 |
| JP | 2005-307778 | 11/2005 |
| JP | 2006-316733 | 11/2006 |
| JP | 2007-23883 | 2/2007 |
| JP | 2007-218196 | 8/2007 |
| JP | 2007-239740 | 9/2007 |
| JP | 4008867 | 11/2007 |
| JP | 2008-133764 | 6/2008 |

OTHER PUBLICATIONS

International Search Report issued Apr. 19, 2011 in corresponding International Application No. PCT/JP2011/051511.

* cited by examiner

| TSN | REGENERATION METHOD · PRESENCE | SPECIAL INSTRUCTION ABOUT ENGINE BODY |
|---|---|---|
| 1 | (COLLECTION OPERATION) | SOOT COLLECTION |
| 2 | AUTO. REGENERATION ○ MANUAL REGENERATION × | |
| 3 | AUTO. REGENERATION × MANUAL REGENERATION ○ | -WARNING 1 BY DPF LAMP |
| 4 | AUTO. REGENERATION × MANUAL REGENERATION ○ | -WARNING 2 BY DPF LAMP -ENGINE OUTPUT REDUCTION |
| 5 | AUTO. REGENERATION × SLOW REGENERATION ○ | -WARNING 3 BY DPF LAMP -ENGINE OUTPUT REDUCTION -SLOW REGENERATION IS ALLOWED IN PRESENCE OF SERVICE STAFF -OIL CHANGE NEEDED AFTER SLOW REGENERATION |
| 6 | FORCED REGENERATION × | HANDLED AS DAMANGE AND REQUIRED MAINTENANCE BY DEALER |

EXHAUST GAS PURIFICATION APPARATUS AND METHOD FOR ENGINE AND FILTER REGENERATION SYSTEM OF THE EXHAUST GAS PURIFICATION APPARATUS

TECHNICAL FIELD

The present invention relates to an exhaust gas purification apparatus for an engine and a method thereof, which is provided with a filter, the filter being provided in an exhaust passage of the engine, collecting particulate matter and being regenerated for fuel removal by heating the collected particulate matter, and further relates to a filter regeneration system for the exhaust gas purification apparatus.

BACKGROUND ART

As an exhaust gas purification apparatus for purifying exhaust gas of a diesel engine, an exhaust gas purification apparatus provided with a DPF (Diesel Particulate Filter) is known. In this type of exhaust gas purification apparatus, soot which is particulate matter (PM) contained in the exhaust gas, is collected by the DPF and then exhausted.

The DPF allows limited accumulation amount of soot collected therein. Thus, when there is too much soot accumulated in the DPF, normally an automatic regeneration or a manual regeneration is performed to prevent so-called "over-accumulation state". More specifically, when the soot is accumulated in the DPF more than a certain amount, an engine control unit (ECU) automatically performs the regeneration (operation-period regeneration) in the automatic regeneration or, a user is notified of a regeneration timing by a means such as a lighting/flashing means and then performs the regeneration through a switch operation or the like in the manual regeneration.

Although the above automatic regeneration or the manual regeneration is performed, the DPF remains in the over-accumulation state in some cases. In such case, the output of the engine is reduced and the regeneration is prohibited in a limp home mode. In such case, the vehicle installed with the above engine, is taken to a service deposit such as a dealer and a repair factory to reset the engine from the above state. In the service deposit, the DPF in the over-accumulation state is removed from the engine and cleaned or replaced to cancel the over-accumulation state.

In the case where the DPF is in the over-accumulation state, as for an on-road vehicle which is made for driving on a general road, the vehicle can be moved or transported easily to the service deposit. However, as for an industrial vehicle which is not made for driving on a general road, it is difficult to move or transport the vehicle to the service deposit. This is due to the fact that such industrial vehicles are subjected to restrictions such as the limited number of service deposits, limited service space and restricted moving method.

As a technique to regenerate the DPF, disclosed in Patent Literatures 1 and 2 is how to decide a regeneration temperature and a regeneration timing in accordance with the PM accumulation amount of the DPF.

As a technique to solve the over-accumulation state of the DPF, disclosed in Patent Literature 3 is how to control an operation method so as to produce required torque without increasing the PM in such a case that the DPF becomes in the over-accumulation state and the engine is in the limp home mode.

Further, disclosed in Patent Literature 4 is a technique to regenerate the DPF by combusting the PM accumulated in the DPF through controlling of an electric heating means and an air supply means in the case where the DPF is in the over-accumulation state.

CITATION LIST

Patent Literature

[Patent Literature 1] JP 4008867 B
[Patent Literature 2] JP 2007-239740 A
[Patent Literature 3] JP 2007-218196 A
[Patent Literature 4] JP 2000-38917 A

SUMMARY OF INVENTION

Technical Problem

The technique disclosed in Patent Literatures 1 and 2 does not relate to the over-accumulation state of the DPF and the DPF cannot be regenerated in the over-accumulation state.

According to the technique disclosed in Patent Literature 3, the required torque can be produced without increasing the PM in the over-accumulation state of the DPF. However, the over-accumulation state of the DPF cannot be solved.

Further, the technique disclosed in Patent Literature 4 requires the electric heating means such as a electric heating device to be provided and the issues remains such as increase of the production cost due to increased number of parts, a limited configuration space and a new cause of breakage.

In view of the above issues, it is an object of the present invention is to provide an exhaust gas purification apparatus and an exhaust gas purification method for an engine including a filter in an exhaust passage for collecting particulate matter in exhaust gas, which is capable of regenerating the filter without requiring additional parts even when the soot is collected in the filter not less than a certain amount and becomes in the over-accumulation state, as well as a filter regeneration system for the exhaust gas purification apparatus.

Solution to Problem

To solve the above problem, the present invention provides an exhaust gas purification apparatus for an engine, the apparatus including, but not limited to:

a filter which is arranged in an exhaust passage of the engine and collects particulate matter contained in exhaust gas and in which active regeneration is performed to burn out the collected particulate matter by heating;

an oxidation catalyst which is arranged upstream of the filter and which is used to heat the filter; and a regeneration control unit which performs regeneration of the filter by burning the particulate matters accumulated in the filter, wherein the control unit comprises an over-accumulation state determination unit and a switch, wherein the over-accumulation state determination unit determines that the particulate matter is over-accumulated in the filter in such a case that:

the amount of the particulate matter accumulated in the filter becomes not less than a specified amount which is greater than a predetermined amount of a normal regeneration starting condition;

the amount of the particulate matter accumulated in the filter is less than the specified amount and a specified time has passed since a last regeneration of the filter, the specified time being greater than a predetermined time of the normal regeneration starting condition; or the amount of the particulate matter accumulated in the filter is less than the specified amount and an amount of fuel supply reaches a specified supply amount which is greater than a predetermined supply amount of the normal regeneration starting condition, wherein the switch switches a regeneration temperature for regenerating the filter between a first regeneration temperature at which a normal regeneration is performed and a second regeneration temperature which is lower than the first regeneration temperature, and wherein the control unit is connectable to a command unit, in such a case that the over-accumulation state determination unit determines that the particular matter is over-accumulated in the filter, so that the switch is forcibly operated toward the second regeneration temperature.

By this, in the case where the particular matter accumulated in the filter exceed the specified amount, i.e. in "an over-accumulation state", the command unit is connected to the control unit and the switch is operated toward the second regeneration temperature which is lower than the first regeneration temperature and thus, it is possible to regenerate the DPF at the second regeneration temperature even in the over-accumulation state. Therefore, the filter can be regenerated even in the over-accumulation state and thus, there is no need to replace the filter or remove and clean the filter when the filter is in the over-accumulation state. This significantly saves the work for resetting the over-accumulation state.

In the above exhaust gas purification apparatus, the control unit may further includes an accumulation estimation unit which estimates an amount of the particulate matter accumulated in the filter from an operation state of the engine, and the second regeneration temperature may be set, in correspondence to the amount of the particulate matter accumulated in the filter, to or below a limit temperature that does not cause over-heating of the filter during the regeneration.

By this, the filter can be regenerated without causing overheating even in the over-accumulation state and the over-accumulation state can be reset. Therefore, it is possible to improve the safety regarding the regeneration and to prevent damages such as melting of the filter.

In the above exhaust gas purification apparatus, in such a case that the over-accumulation state determination unit determines that the particular matter is over-accumulated in the filter, the control unit may control, during the regeneration of the filter, the second regeneration temperature with respect to time in accordance with change of the estimated amount of the particulate matter accumulated in the filter with respect to the time, the estimated amount of the particulate matter being estimated by the accumulation estimation unit.

By changing the second regeneration temperature with respect to time in accordance with change of the estimated amount of the particulate matter, it is possible to set the second regeneration temperature as high as possible in accordance with the PM accumulation state of the filter during the regeneration. Thus, the regeneration time at the second regeneration temperature which is lower than the first regeneration temperature can be reduced as much as possible, and the time regarding the time for resetting the over-accumulation state can be appropriately set. By this, it is possible to reduce the risk of oil dilution. The oil used in the engine is diluted as the filter regeneration is prolonged.

The second regeneration temperature may be set at a certain value not greater than the limit temperature that does not cause over-heating of the filter during the regeneration in such a case that the amount of the particulate matter collected in the filter is equal to the specified amount which is a criterion for determination by the over-accumulation state determination unit.

By this, the regeneration time is longer but the over-accumulation state of the filter can be solved more safely by regenerating the filter at the second regeneration temperature.

The control unit may control so that the switch is forcibly operated toward the first regeneration temperature in such a case that the over-accumulation state determination unit determines that the particular matter is over-accumulated in the filter and the estimated amount of the particular matter accumulated in the filter which is estimated by the accumulation estimation unit is reduced to or below the specified amount due to the regeneration of the filter, the specified amount being a criterion for determination by the over-accumulation state determination unit.

By regenerating the filter at the second regeneration temperature, the amount of the particulate matter accumulated in the filter is reduced to or below the specified amount where the filter can be regenerated at the first temperature and then, the filter is regenerated at the first regeneration temperature which is higher than the second regeneration temperature. Thus, it is possible to reduce the overall time required to regenerate the filter.

The control unit may prohibit the regeneration of the filter when the amount of the particulate matter accumulated in the filter reaches a certain amount greater than the specified amount.

The certain amount is set at an accumulation amount which causes the overheating of the filter during the regeneration at the second regeneration temperature. By this, it is possible to improve the safety in the regeneration of the filter at the second regeneration temperature.

To solve the above problem, the present invention provides an exhaust gas purification method for an engine, wherein particulate matter contained in exhaust gas is collected by a filter arranged in an exhaust passage of the engine and, when the particulate matter collected in the matter becomes not less than a predetermined amount, the filter is regenerated by injecting fuel at a timing that does not contribute to combustion in a combustion chamber of the engine and burning the particulate matter using an oxidation catalyst, wherein the particulate matter is determined to be over-accumulated in the filter in such a case that:

the amount of the particulate matter accumulated in the filter becomes not less than a specified amount which is greater than a predetermined amount of a normal regeneration starting condition;

the amount of the particulate matter accumulated in the filter is less than the specified amount and a specified time has passed since a last regeneration of the filter, the specified time being greater than a predetermined time of the normal regeneration starting condition; or the amount of the particulate matter accumulated in the filter is less than the specified amount and an amount of fuel supply reaches a specified supply amount which is greater than a predetermined supply amount of the normal regeneration starting condition, and wherein, in such a case that the particulate matter is determined to be over-accumulated, a regeneration temperature for regenerating the filter is set to a second temperature by operating a switch by which the regeneration temperature can be switched between a first regeneration temperature at which a normal regeneration is performed and the second regeneration temperature which is lower than the first regeneration.

The amount of the particulate matter accumulated in the filter may be estimated from an operation state of the engine, and the second regeneration temperature may be set, in correspondence to the amount of the particulate matter accumulated in the filter, to or below a limit temperature that does not cause over-heating of the filter during the regeneration.

In such a case that the particular matter is determined to be over-accumulated in the filter, the second regeneration temperature may be changed, during the regeneration of the filter, with respect to time in accordance with change of the amount of the particulate matter accumulated in the filter with respect to the time.

In such a case that the amount of the particulate matter accumulated in the filter is equal to the specified amount which is a criterion for determining the over-accumulation in the filter, the second regeneration temperature may be set at a certain value not greater than the limit temperature that does not cause over-heating of the filter during the regeneration of the filter.

In such a case that the particular matter is determined to be over-accumulated in the filter and then the amount of the particulate matter accumulated in the filter is reduced to or below the specified amount by regenerating the filter at the second temperature, the switch may be forcibly operated toward the first regeneration temperature, the specified amount being a criterion for determining the over-accumulation of the filter.

In such a case that the filter is regenerated at the second regeneration temperature, the temperature may be raised to the second temperature at a rate slower than a rate of raising the temperature to the first temperature to regenerate the filter at the first temperature.

By this, a maximum endpoint temperature is minimized inside the filter and the overheating of the filter is prevented. Thus, the DPF can be regenerated more safely.

Further, after the regeneration of the filter at the second regeneration temperature is completed, oil used for the engine may be changed.

By regenerating the filter at low temperature, i.e. the second regeneration temperature, the regeneration of the filter is prolonged, resulting in increasing the risk of oil dilution which is dilution of the oil used from the engine. Therefore, by changing the oil after the regeneration of the filter at the second regeneration temperature, it is possible to prevent the trouble caused by the oil dilution after the regeneration ends.

Further, a filter regeneration system regarding an exhaust gas purification apparatus for an engine, the apparatus comprising: a filter which is arranged in an exhaust passage of the engine and collects particulate matter contained in exhaust gas and in which regeneration is performed to burn out the collected particulate matter by heating; an oxidation catalyst which is arranged upstream of the filter and which is used to heat the filter; and a control unit which performs regeneration of the filter by burning the particulate matters accumulated in the filter, wherein the control unit comprises an over-accumulation state determination unit and a switch, wherein the over-accumulation state determination unit determines that the particulate matter is over-accumulated in the filter in such a case that:

the amount of the particulate matter accumulated in the filter becomes not less than a specified amount which is greater than a predetermined amount of a normal regeneration starting condition;

the amount of the particulate matter accumulated in the filter is less than the specified amount and a specified time has passed since a last regeneration of the filter, the specified time being greater than a predetermined time of the normal regeneration starting condition; or the amount of the particulate matter accumulated in the filter is less than the specified amount and an amount of fuel supply reaches a specified supply amount which is greater than a predetermined supply amount of the normal regeneration starting condition, wherein the switch switches a regeneration temperature for regenerating the filter between a first regeneration temperature at which a normal regeneration is performed and a second regeneration temperature which is lower than the first regeneration temperature, wherein the filter regeneration system comprises a command unit and a server, the command unit being connectable to the control unit in such a case that the over-accumulation state determination unit determines that the particulate matter is over-accumulated in the filter and being capable of forcibly operating the switch toward the second regeneration temperature, the server being capable of communicating with the command unit, and wherein, when being connected to the control unit, the command unit reads information regarding the engine from the control unit, supplies the information regarding the engine to the server, and transmits to the server such information after completion of the regeneration that the switch is operated to the second regeneration temperature and the regeneration is performed.

Furthermore, the server may compare the information regarding the engine supplied from the command unit with a database stored in the server and determine whether or not to permit switching operation of the switch by the command unit, and in a case of allowing the switching operation of the switch, the server may transmit permission information to the command unit and the command unit may operate the switch based on the permission information from the server.

By this, an owner of the command unit can charge an owner of the vehicle installed with the exhaust gas purification apparatus for the work regarding the regeneration of the filter using the command unit.

The owner of the server transmits the permission information to the command unit upon receiving the information from the command unit and surely acknowledges the usages of the command unit by receiving information regarding completion of the regeneration from the command unit. Further, the information regarding the engine and regarding completion of the regeneration is sent from the command unit, the owner of the server can acknowledge information such as the usages of the engine and the gas purification apparatus in the market and the regeneration state of the filter.

The above command unit, after the regeneration is completed at the second regeneration temperature, may display a message to promote oil change of the engine and, in such a case that the oil is changed based on the displayed message, may transmit such information to the server that the oil is changed.

By this, the oil is positively changed after completing the regeneration of the filter at the second regeneration temperature and troubles caused by the oil dilution after the completing the regeneration can be prevented.

The server may be used to charge a user of the command unit a prescribed service fee based on the information transmitted from the command unit.

As the service fee is charged based on the information transmitted from the command unit, the owner of the command unit can positively charge the service fee.

Advantageous Effects of Invention

According to the present invention, it is possible to provide an exhaust gas purification apparatus and an exhaust gas purification method for an engine including a filter in an exhaust passage for collecting particulate matter in exhaust gas, which is capable of regenerating the filter without requiring additional parts even when the soot is collected in the filter not less than a certain amount and becomes in the over-accumulation state, as well as a filter regeneration system for the exhaust gas purification apparatus.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Embodiment

Figure 1:
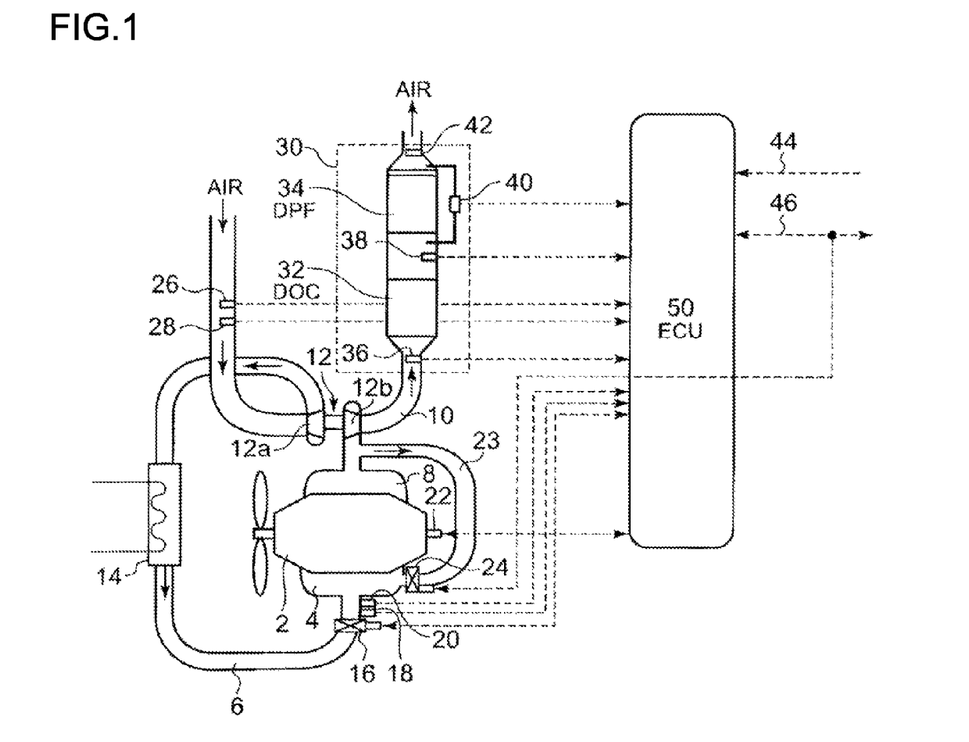
FIG. 1 shows a structure around an engine to which an exhaust gas purification apparatus of a first embodiment is applied.

FIG. 1 shows a structure around an engine to which an exhaust gas purification apparatus of a first embodiment is applied.

To an engine 2, an air supply passage 6 is connected via an air supply manifold 4 and an exhaust passage 10 is connected via an exhaust manifold 8.

In the air supply passage 6, a compressor 12a of a turbocharger 12 is provided. The compressor 12a is coaxially driven by a turbine 12b which is described later. Downstream of the compressor 12a in the supply passage 6, an intercooler 14 is provided to perform heat exchange of intake air streaming in the air supply passage 6 with the air. Downstream of the intercooler 14 in the air supply passage 6, a throttle valve 16 is provided to adjust the flow rate of the intake air streaming in the air supply passage 6.

Upstream of the compressor 12a in the air supply passage 6, an air flow meter 26 for detecting the flow rate of the supply air and an intake air temperature sensor 28 for detecting the temperature of the intake air are provided. The detection results of the air flow meter 26 and the intake air sensor 28 are read to a EUC (Engine Control Unit) 50. Further, downstream of the throttle valve 16 in the air supply passage 6, an absolute pressure sensor 18 for detecting an absolute pressure of the supply air and an intake air temperature sensor 20 for detecting a temperature of the intake air are provided. The detection results of the absolute pressure sensor 18 and the intake air temperature sensor 20 are read to the EUC 50.

In the exhaust passage 10, the turbine 12b of the turbocharger 12 is provided. The turbine 12b is driven by exhaust gas from the engine 2. To the exhaust passage 10, an EGR passage 23 is connected to recirculate a portion of the exhaust gas, (EGR gas) to an air supply side. In the EGR passage 23, an EGR control valve 24 is provided to control a flow rate of the EGR gas flowing in the EGR passage 23.

Downstream of the turbine 12b in the exhaust passage 10, an exhaust gas purification apparatus 30 is provide to perform aftertreatment of the exhaust gas. The exhaust gas purification apparatus 30 includes a DOC (an oxidation catalyst) 32 and a DPF 34. The DOC 32 has a function of burning out the soot collected in the DPF 34 by processing hydrocarbon (HC) and carbon monoxide (CO) contained in the exhaust gas into harmless gases through oxidation catalysis and oxygenating NO and NO2 contained in the exhaust gas as well as a function of raising a temperature of the exhaust gas through oxidation catalysis of unburned component contained in the exhaust gas. The DPF 34 is arranged downstream of the DOC 32 and collects the soot contained in the exhaust gas. Further, the exhaust gas purification apparatus 30 is provided with a DOC inlet temperature sensor 36 for detecting an inlet temperature of the DOC 32, and a DPF inlet temperature sensor 38 and a DPF outlet temperature sensor 42 for detecting inlet and outlet temperatures of the DPF 34, respectively. The detected values of the DOC inlet temperature sensor 36, the DPF inlet temperature sensor 38 and the DPF outlet temperature sensor 42 are inputted to the ECU 50. The exhaust gas purification apparatus 30 is further provided with a DPF pressure difference sensor 40 for detecting a pressure difference between the inlet and the outlet of the DPF 34. The detected value of the DPF pressure difference sensor 40 is inputted to the ECU 50 as well.

In the engine 2, a variety of devices are provided to communicate with the ECU 50, which includes an injector rail pressure sensor, a combustion temperature sensor, crank sensor, a cam sensor, a fluid temperature sensor, a hydraulic pressure sensor. These devices are together shown as numeral 22 in FIG. 1.

Further, in the ECU 50, target opening degrees of the EGR control valve and the throttle valve are calculated based on each value read by the ECU 50 as described above.

Furthermore, the ECU 50 reads an accelerator input signal via a cable 44 and is connected to a vehicle-body ECU (not shown) via a cable 46.

In the above configuration, the DPF 3 constituting the exhaust gas purification apparatus 30 collects the soot which is the particulate matter (PM). However, this is a limit as to how much soot the DPF 3 can collect. Thus, it is necessary to regenerate the DPF 34 by removing the soot collected in the DPF 34.

The regenerating of the DPF 34 in the embodiment is explained in reference to FIG. 2 to FIG. 10.

Figure 2:
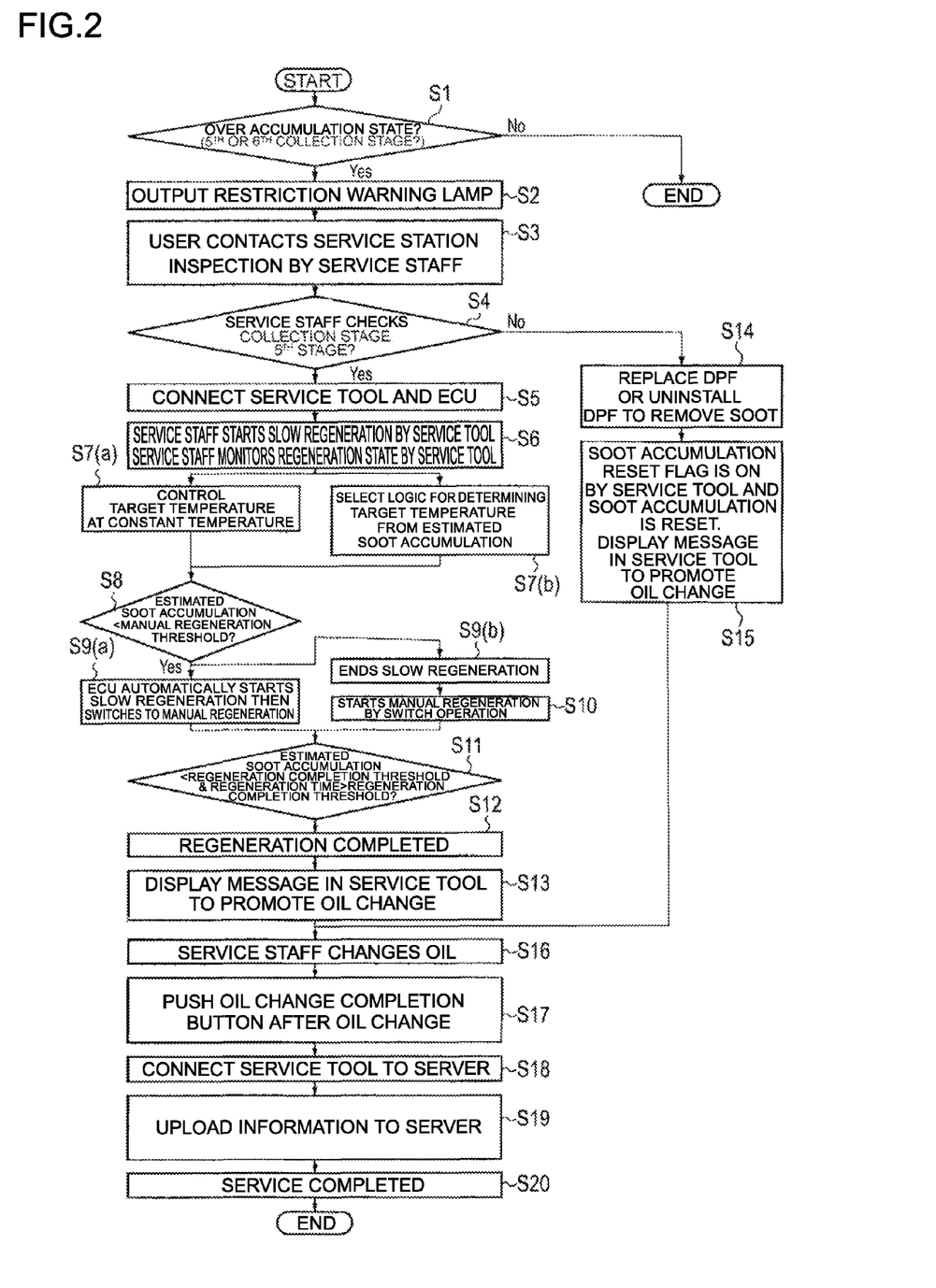
FIG. 2 is a flow chart regarding a process of regenerating a DPF of the first embodiment.

FIG. 2 is a flow chart regarding a process of regenerating a DPF of the first embodiment.

In FIG. 2, the regeneration process starts. More specifically, once the ECU 50 begins operating, the process advances to a step S1.

In the step S1, the ECU 50 determines whether or not a current state of the DPF 34 is an over-accumulation state, i.e. whether it is in a fifth or sixth collection stage.

Now the collection stages are explained.

Figure 3:
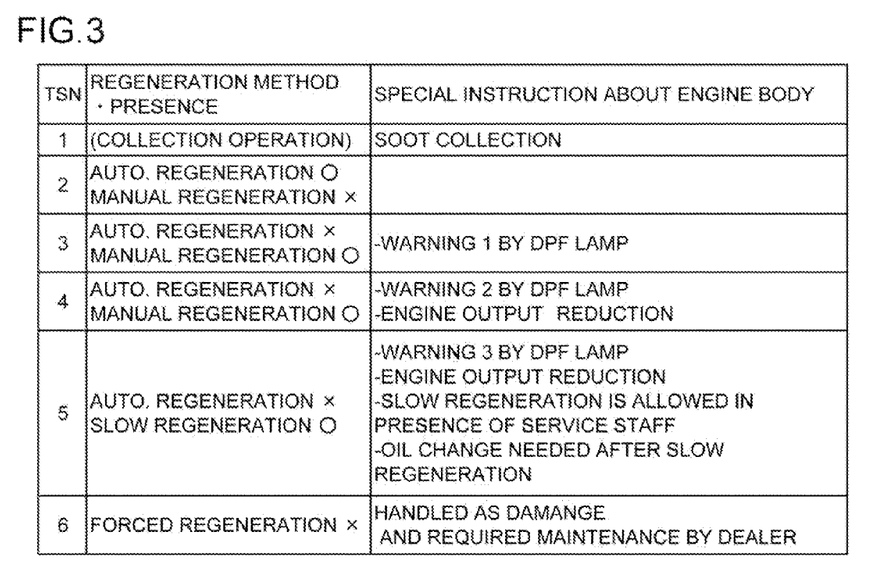
FIG. 3 is a table regarding collection stages of the first embodiment.

FIG. 3 is a table regarding the collection stages of the first embodiment. In a first collection stage, it is not necessary to regenerate the DPF 34. In a second collection stage, an automatic regeneration of the DPF 34 is carried out. In third and fourth collection stages, a manual regeneration of the DPF 34 is carried out. In the fifth collection stage, a slow regeneration described later is carried out. In the sixth collection stage, the DPF 34 is in a stage where the regeneration is impossible.

Figure 4:
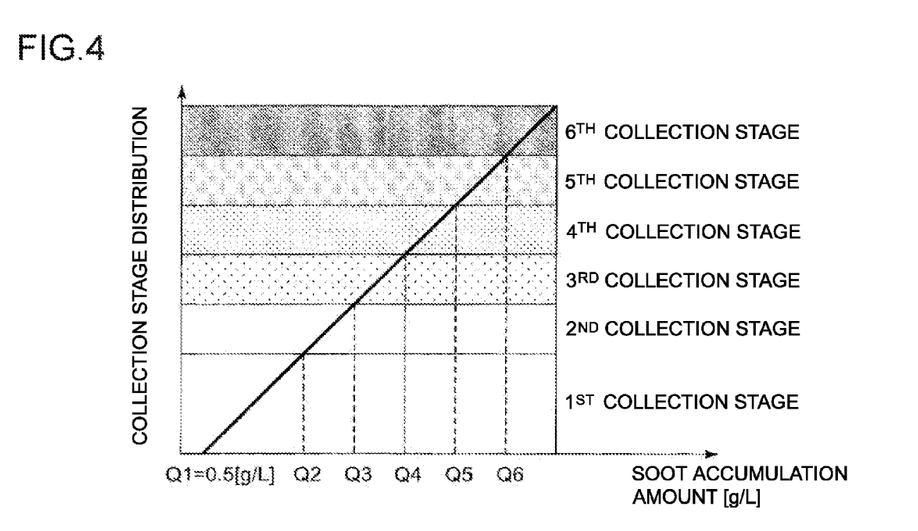
FIG. 4 is a table showing a relationship between the collection stages and a soot accumulation amount in DPF 34 in the first embodiment.

A collection stage is decided among the collection stages shown in FIG. 3, for instance, based on the soot accumulation amount of the DPF 34. FIG. 4 is a table showing a relationship between the collection stages and the soot accumulation amount in DPF 34 in the first embodiment. FIG. 4 shows the collection stages on a vertical axis and the soot accumulation amount of the DPF 34 on a horizontal axis.

As shown in FIG. 4, the collection stage is decided based on the soot accumulation amount of the DPF 34. The greater the soot accumulation amount is, the higher the collection stage becomes. In the embodiment example shown in FIG. 4, the soot accumulation amount not greater than Q2 [g/L] belongs to the first collection stage, the soot accumulation amount not greater than Q3 [g/L] belongs to the second collection stage, the soot accumulation amount not greater than Q4 [g/L] belongs to the third collection stage, the soot accumulation amount not greater than Q5 [g/L] belongs to the fourth collection stage, the soot accumulation amount not greater than Q6 [g/L] belongs to the fifth collection stage, and the soot accumulation amount greater than Q6 [g/L] belongs to the sixth collection stage. This kind of graph is stored in the ECU 50 in advance.

Figure 5:
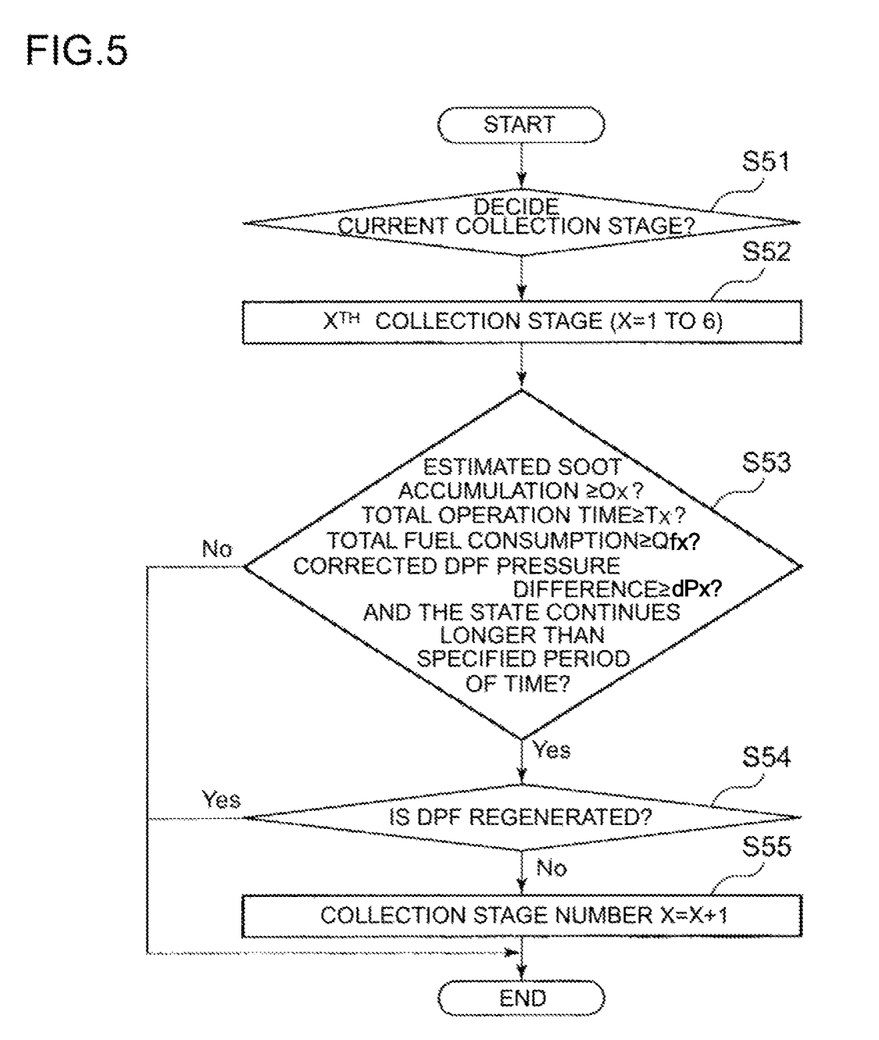
FIG. 5 is a flow chart regarding a process of determining a collection stage in the first embodiment.

FIG. 5 is a flow chart regarding a process of determining the collection stage in the first embodiment. In accordance with the flow chart of FIG. 5, the collection stage is decided by the ECU 50.

In FIG. 5, once the process starts, the current collection stage is decided in a step S51 and the process advances to a step S52. The current collection stage decided in the step S51 is the collection stage that has been decided in one cycle before the cycle of the flow chart of FIG. 5 and that is stored in the ECU 50.

Once the current collection stage is decided, in a step S53, it is determined whether or not any of the following states is established, an estimated soot accumulation amount is $\geq$Qx, a total operation time$\geq$Tx, a total fuel consumption$\geq$Qfx and a DPF corrected pressure difference$\geq$dPx, and a specified period of time or more has passed since the state has been established.

Figure 6:
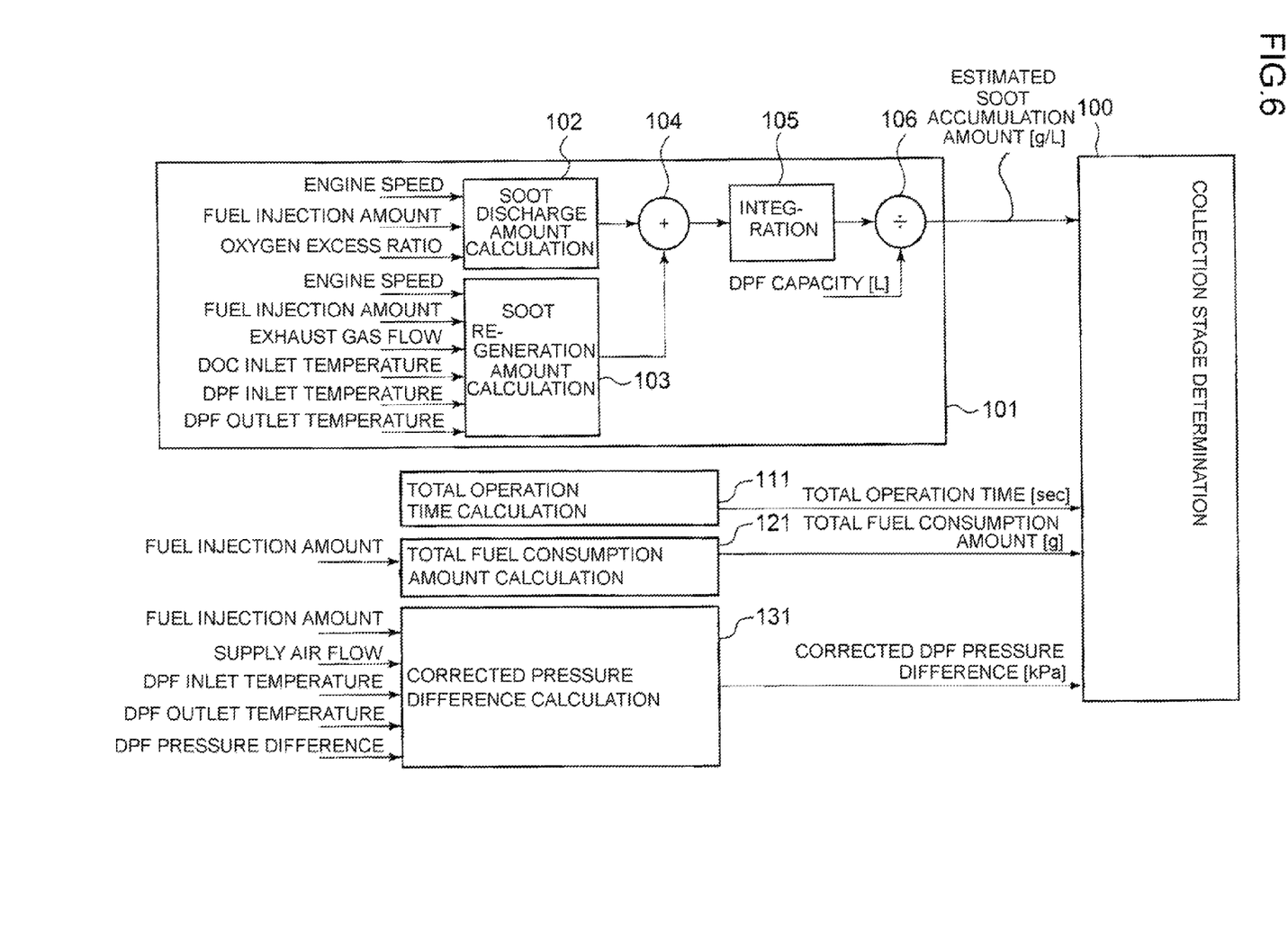
FIG. 6 is a diagram of calculating each parameter regarding the collection stage determination in the first embodiment.

The step S53 is described in reference to FIG. 6.

FIG. 6 is a diagram of calculating each parameter regarding the collection stage determination in the first embodiment.

FIG. 6 shows calculation 101 for calculating an estimated soot accumulation amount of the DPF 34. In the estimated soot accumulation amount calculation 101, a soot discharge amount from the engine is calculated in 102 from each detection value of an engine rotation speed, a fuel injection amount to the engine and an oxygen excess ratio and a soot regeneration amount is calculated in 103 from each detection value of the engine rotation speed, the fuel injection amount to the engine, a flow rate of the exhaust gas, the DOC inlet temperature, the DPF inlet temperature and the DPF outlet temperature. Next, the soot discharge amount and the soot regeneration amount are added in 104, integrated in 105, and then divided by a capacity of the DPF 34 in 106. In this manner, the estimated soot accumulation amount [g/L] is obtained. In 100, it is determined whether or not the estimated soot accumulation amount obtained in 106 is not less than Qx of the corresponding collection stage X having been selected in the step S51 of FIG. 5 and also whether or not it has lasted more than the specified period of time using a graph like the one shown in FIG. 4.

Graphs similar to the graph shown in FIG. 4, regarding the total operation time from the last regeneration of the DPF 34, the total fuel consumption from the last regeneration of the DPF 34 and the corrected pressure difference between the front and the back of the DPF, 34 are stored beforehand in the ECU 50 as well. It is determined using the above-mentioned pre-stored graph similar to the graph of FIG. 4 whether or not each of the following values is not less than Tx, Qfx and dPx, respectively, of the corresponding collection stage decided in the step S51 of FIG. 5 as well as the state has been continuous for the specified period of time or longer. The above mentioned values are the total operation time calculated in 111, the total fuel consumption amount calculated from the fuel injection amount to the engine in 121, and the corrected pressure difference calculated in 131 from the fuel injection amount, the flow rate of the supply air, the DPF inlet temperature, the DPF outlet temperature and the DPF pressure difference.

Herein, the corrected pressure difference is obtained by converting the pressure difference between the front and the back of the DPF 34 of the normal state using a rate of an exhaust gas accumulation flow rate relative to a standard gas flow rate. This is due to the fact that, even with the same soot accumulation amount of the DPF 34, the pressure difference of the DPF 34 varies depending on the exhaust gas accumulation flow rate.

More specifically, in the step S53 of FIG. 5, the estimated soot accumulation amount, the total operation time, the total fuel consumption amount and the DPF pressure difference are calculated and it is determined whether or not the state that the calculated values are not less than the predetermined value (Qx, Tx, Qfx, dPx) has been continuous for the specified period of time. Further, in the step S53, when any one of the estimated soot accumulation amount, the total operation time, total fuel consumption amount and the corrected DPF pressure difference is continuously not less than the predetermined value for the specified period of time, it is determined as YES.

In the flow chart of FIG. 5, when it is determined as NO in the step S53, the process ends there and the current collection stage having been decided in the S51 continues to be used.

In contrast, when it is determined as YES in the step S53, the process advances to the step S54 to determined whether or not the DPF 34 is currently regenerated. If it is determined as YES in the step S54, i.e. the DPF 34 being currently regenerated, the process ends there and the current collection stage having been decided in the S51 continues to be used. If it is determined as NO in the step S54, i.e. the DPF 34 being not currently regenerated, the process advances to a step S55 to decide a collection stage which is one stage higher than the current collection stage having been decided in the S51 and the process ends.

Once the collection stage is decided according to the flow chart shown in FIG. 5, it is determined in the step S1 of FIG. 2 whether or not the collection stage having been decided is the fifth or sixth collection stage. If the collection stage having been decided is the fifth or sixth collection stage, the DPF is determined to be in the over-accumulation state and determined as YES in the step S1, whereas if the collection stage having been decided is one of the first to fourth collection stages, the DPF is determined not to be in the over-accumulation state and determined as NO in the step S1.

If it is determined as NO in the step S1, the process ends there.

On the other hand, if it is determined as YES in the step S1, the process advances to a step S2.

In the step S2, based on the command from the ECU 50, the output of the engine is restricted and an user such as a driver is notified of the over-accumulation state of the DPF 34 by a notifying means such as a warning lamp (not shown) provided in a drivers seat or the like Once the step S2 is completed, the process advances to a step S3.

In the step S3, the user acknowledges the over-accumulation state of the DPF 34 by confirming the notifying means such as the warning lamp. Then, the user contacts a service station owning service tools such as a dealer and a repair factory.

Once the step S3 is completed, a service staff is sent from the service station upon receiving the contact in a step S4. Alternatively, the vehicle installed with the purification apparatus 30 of the present invention may be brought into the service station. Then, the service staff may determine whether or not the collection stage of the DPF 34 is the fifth collection stage.

If it is determined as YES that the DPF 34 is in the fifth collection stage, the process advances to a step S5. In the step S5, the service staff connects a service tool brought by the service staff to the ECU 50. The service tool is described later in details.

Once the step S5 is completed, the DPF is slowly regenerated using the service tool by the service staff in a step S6.

The slow regeneration of the DPF 34 is explained here.

Normally, during the regeneration of the DPF, the inlet temperature of the DPF is controlled to 600° C. However, in the slow regeneration, the regeneration is slowly performed at low temperature, e.g. 530° C. to avoid overheating.

Figure 7:
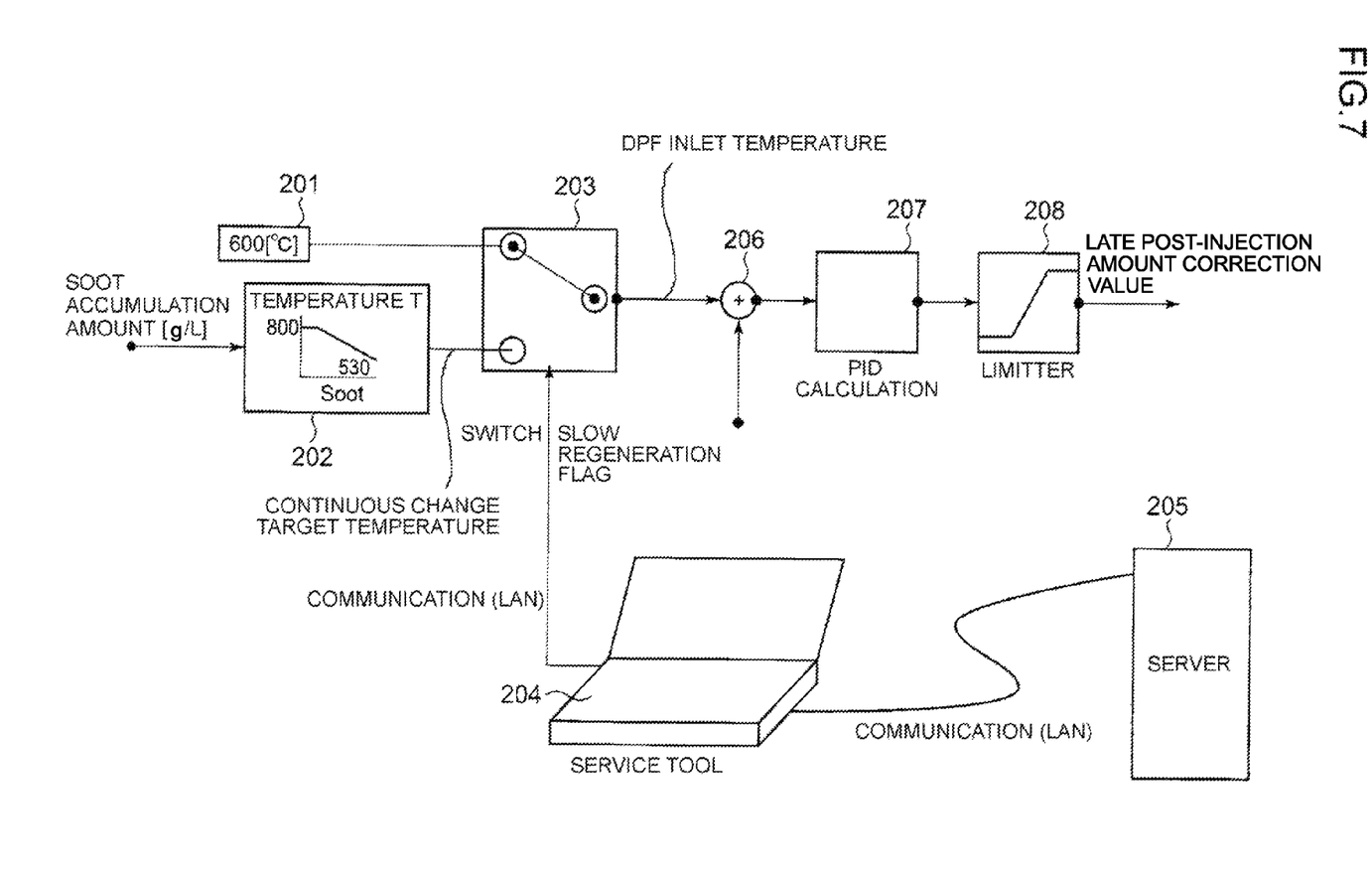
FIG. 7 is a diagram showing logic of a slow regeneration control.

FIG. 7 is a diagram showing logic of the slow regeneration control.

During the normal regeneration, a switch 203 regarding the regeneration control is turned on at a side 201 and for instance, a target temperature of the DPF inlet temperature is 600° C. as shown in 201 and the detected DPF inlet temperature is compared with the target temperature in 206, PID operation is conducted in 207, and then a late post-injection amount of the fuel regarding the regeneration of the DPF in 208.

During the slow regeneration, the service tool 204 is connected to the switch 203. The will of performing the slow regeneration is expressed by connecting the service tool 204 and pressing a start bottom of starting the slow regeneration shown on an operation display of the service 204, or the like. By this, the service tool 204 obtains from the ECU 50 information regarding the exhaust gas purification apparatus 30, and supplies the obtained information to a server 205 which is communicatable with the service tool 204 by LAN, wireless connection or the like. The service 205 receives the information and then determines whether or not to allow a switching operation of the switch using the command unit by comparing the information with a database stored inside, and transmits permission information to the service tool. Upon receiving the permission information, the service tool 204 slowly turns on a regeneration flag. Once the regeneration flag is ON, the ECU 50 recognizes the slow regeneration and the switch is operated toward a map side 202 to decide a target DPF inlet temperature appropriate for the slow regeneration.

In addition to the slow regeneration of the DPF 34, the service tool 204 performs, through communication with the ECU 50, writing data in ECU (software parameter), monitoring the state of the ECU, and reading data. During this process, the service tool 204 identifies a model number of the ECU, a version of the software and a unique number of the injector. Further, through communication with the server 205 via LAN and wire connection, the service tool 204 uploads data from the server 205 and uploads data read from the ECU to the server 205. Furthermore, during the slow regeneration or Ash maintenance, the server reads identification numbers of the ECU, the engine, the injector and the DPF as well as the data stored in non-volatile memory of the ECU (the operation state of the engine DPF by the user) and upload them to the server.

The map 202 of FIG. 7 used to decide the target DPF inlet temperature corresponding to the slow generation is explained below.

Figure 8:
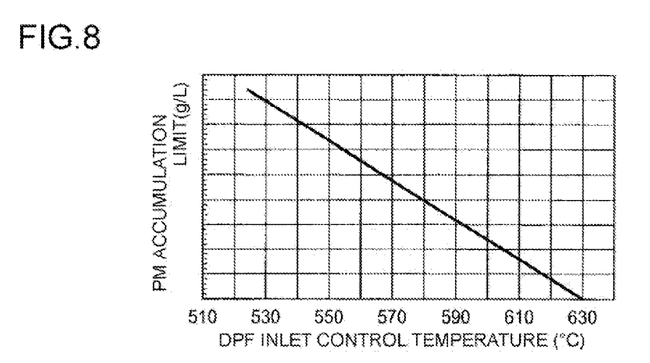
FIG. 8 is a graph showing a relationship between a PM accumulation limit and a DPF inlet control temperature during the regeneration of the DPF.

FIG. 8 is a graph showing a relationship between a PM accumulation limit and the DPF inlet control temperature during the regeneration of the DPF. FIG. 8 shows the PM accumulation limit on the vertical axis. The PM accumulation limit is a maximum soot accumulation amount at which the regeneration of the DPF 34 can be performed stably without overheating. FIG. 8 shows the DPF inlet control temperature on the horizontal axis. As seen in FIG. 8, a negative linear relationship is established between the PM accumulation limit and the DPF inlet control temperature. More specifically, the greater the soot accumulation amount in the DPF, the lower the DPF inlet control temperature should be.

Figure 9:
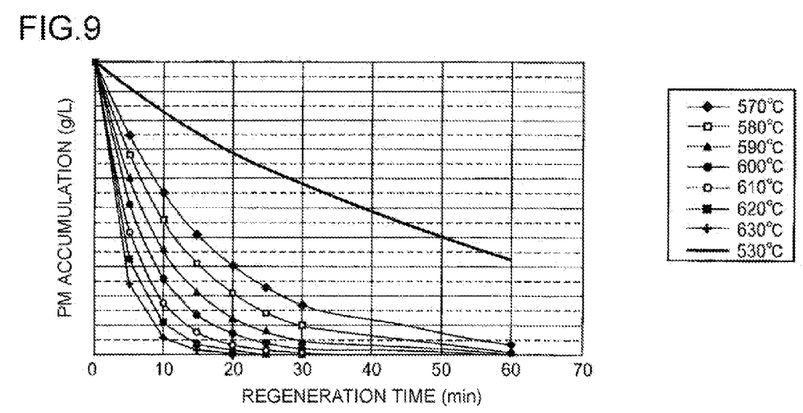
FIG. 9 is a graph showing reduction of the PM accumulation amount with respect to time caused by change in the DPF inlet temperature during the regeneration of the DPF.

FIG. 9 is a graph showing reduction of the PM accumulation amount with respect to time caused by change in the DPF inlet temperature during the regeneration of the DPF 34. FIG. 9 shows the PM accumulation amount on the vertical axis and the regeneration time on the horizontal axis. In FIG. 9, each line represents a change of the PM accumulation with time in a case where the DPF with the same PM accumulation amount is regenerated at each inlet temperature, 530° C., 570° C., 580° C., 590° C., 600° C., 610° C., 620° C. and 630° C. As seen in FIG. 9, the lower the DPF inlet temperature is, the longer it takes to regenerate the DPF.

Therefore, the inlet temperature of the DPF during the slow regeneration may be selected from the following two methods.

The first method is to always set the inlet temperature of the DPF 34 at a temperature corresponding to the soot accumulation amount and control accordingly. Herein, the temperature corresponding to the soot accumulation amount is a temperature equal to or below the DPF inlet control temperature at which the current soot accumulation amount is deemed to be the PM accumulation limit. In this case, the target temperature of the DPF 34 changes in accordance with the soot accumulation amount during the regeneration. By this, it is possible to regenerate the DPF 34 safely at any time and also to appropriately set the regeneration time as short as possible.

The second method is to set the inlet temperature of the DPF 34 at a low temperature which is constant and safe and which is set regardless of the soot accumulation amount. The inlet temperature of the DPF 34 may be 530° C., for example. By this, it takes more time but the regeneration can be done even more safely.

Therefore, in the map 202 of FIG. 7, stored is a map indicating a target value of the DPF inlet control temperature corresponding to the soot accumulation amount is stored in the case of the first method, and a prescribed target value of the DPF inlet control temperature (e.g. 530° C.) during the DPF regeneration is stored in the case of the second method instead of the map.

In the flow chart of FIG. 2, the regeneration starts in the step S6, and then the process advances to a step S7(*a*) or a step S7(*b*). The target DPF inlet temperature is decided by the map or the prescribed value of FIG. 7 and then the regeneration continues until the estimated soot accumulation amount becomes below a manual regeneration threshold in a step S8.

Herein, the step S7(*b*) corresponds to the first method described above, whereas the step S7(*a*) corresponds to the second method described above, and either of the methods can be selected.

When the slow regeneration is performed and the estimated soot accumulation amount reaches below the manual regeneration threshold in the step S8, the process advances to a step S9(*a*) in which the ECU automatically switches the operation from the slow regeneration to a regular manual regeneration. Alternatively, the process may advance to a step S9(*b*) instead. In the step S9(*b*) the slow regeneration is ended and then the manual regeneration starts in a step S10. The slow regeneration threshold is a maximum value of the estimated soot accumulation amount at which the manual regeneration can be performed and is Q5[g/L] in FIG. 4.

Figure 10:
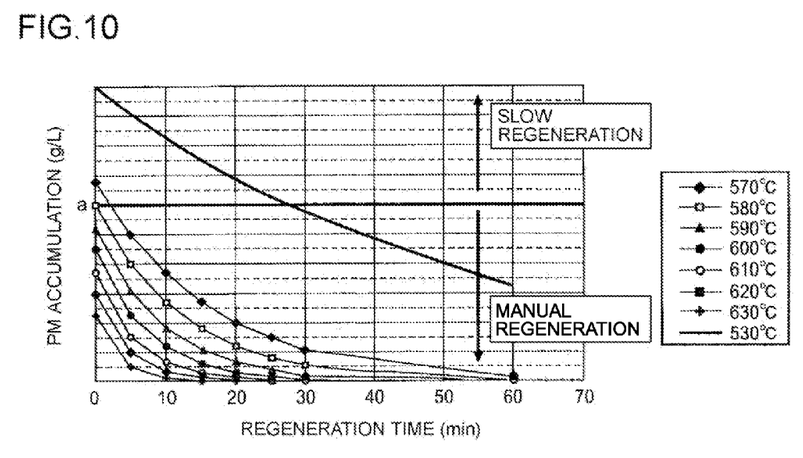
FIG. 10 is a graph used to explain switching from the slow regeneration to a manual regeneration.

FIG. 10 is a graph used to explain switching from the slow regeneration to the manual regeneration. FIG. 10 shows the PM accumulation amount [g/L] on the vertical axis and the regeneration time on the horizontal axis. For instance, the DPF inlet temperature is controlled at the constant target 530° C. in the step S7(*a*) of the flow chart of FIG. 2 and in the case where the manual regeneration threshold is the PM accumulation amount a [g/L], the slow regeneration is performed until the PM decreases below the PM accumulation amount a [g/L] (the regeneration time is approximately 27 minutes in FIG. 10) and past the threshold, the manual regeneration is performed.

In the flow chart shown in FIG. 2, when the manual regeneration starts in the step S9(*a*) or in the step S10 after the step S9(*b*), the manual regeneration continues until the estimated soot accumulation amount becomes less than a prescribed regeneration completion threshold and the regeneration time exceeds a prescribed regeneration completion threshold and in a step S12, the manual regeneration is completed.

Once the regeneration is completed in the step S12, a message to promote oil change of the engine is displayed in the service tool in a step S13.

So far explained is the case where it is determined as YES in the step S4, i.e. the fifth collection stage. On the other hand, if it is determined as NO, i.e. the sixth collection stage, in the step S4, the process advances to a step S14.

The sixth collection stage is a stage in which the soot accumulation of the DPF 34 is too significant to perform the slow regeneration. Thus, in the step S14, the service staff replaces the DPF or cleans the DPF by detaching the DPF and removing the soot. In a step S15, the service staff connects the service tool to the ECU 50 to reset the soot accumulation amount and the message prompting the oil change is displayed in the service tool.

When the message for prompting the oil change is displayed in the service tool in the step S13 or the step S15, the service staff changes the oil in a step S16. This is because the slow regeneration or replacement or cleaning of the DPF can cause oil dilution.

After changing the oil in the step S16, the service staff presses an oil change completion button displaced in the service tool in a step S17. The oil change completion button is provided to positively conduct the oil change and without pressing the oil change completion button, the engine operation is restricted.

After pressing the oil change completion button in the step S17, the service staff connect the service tool to the server 205 in a step S18, uploads the information to the server in a step S19, and then disconnect the service tool from the ECU to complete the service in a step S20. In this manner, the process is finished.

According to the present embodiment, even in the over-accumulation state, the DPF can be regenerated by performing the slow regeneration in the fifth collection mode. By this, it is possible to reduce the need for replacing the DPF or uninstalling and cleaning the DPF.

Further, by controlling at the safe temperature which does not cause over-heating of the DPF even in the over-accumulation state, the DPF is prevented from melting even during the regeneration of the DPF in the over-accumulation state.

Furthermore, by controlling the DPF inlet temperature and controlling the DPF regeneration temperature, it is possible to reduce the regeneration time. This reduces a risk of the oil dilution due to the DPF regeneration.

As the information regarding the slow regeneration and the completion of the oil change is uploaded to the server, an owner of the server can positively acknowledge usages of the service tool. In the case where a user of the service tool is different from a user of the server such as the case the service tool is leased with a license agreement, the user of the server can surely charge the user of the service tool according the usages.

Second Embodiment

In a second embodiment, the configuration around the engine is substantially the same as that of the first embodiment shown in FIG. 1 and a procedure regarding the regeneration of the DPF is approximately the same as that of the first embodiment shown in the flow chart of FIG. 2 and thus they are not explained further. FIG. 3 to FIG. 10 described in the first embodiment are common to the second embodiment as well.

In the second embodiment, when the target temperature is decided by the map 202 shown in FIG. 7, the DPF is heated to the target temperature slower than the normal regeneration. More specifically, rate limit is applied to the target temperature.

Figure 12:
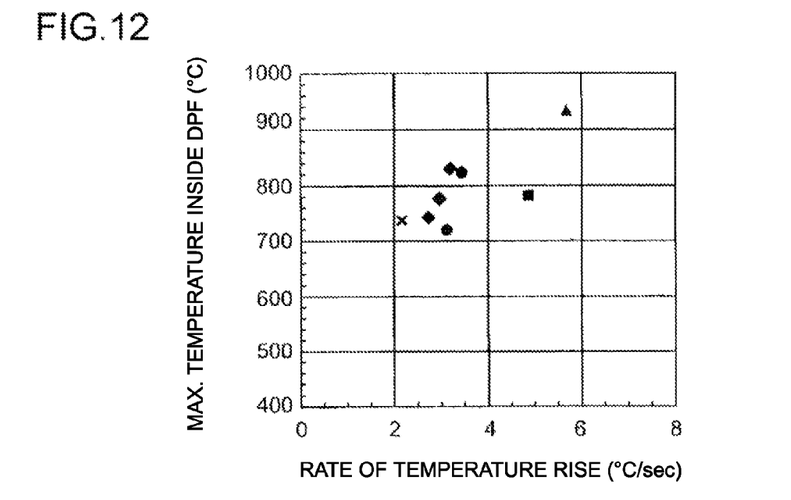
FIG. 12 is a graph showing a relationship between a maximum temperature in the DPF and a rate of raising the temperature.

FIG. 12 is a graph showing a relationship between a maximum interior temperature of the DPF and a rate of raising the temperature. FIG. 12 shows the maximum temperature in the DPF on the vertical axis and the rate of temperature rise on the horizontal axis. In FIG. 12, an initial temperature at the beginning of the heating and a final target temperature are the same in all cases. As shown in FIG. 12, even when the DPF is heated from the same initial temperature to the same target temperature, the maximum endpoint temperature inside the DPF varies depending on the rate of temperature rise. More specifically, the slower the rate of temperature rise is, the lower the interior temperature of the DPF is. Thus, by applying the rate limit to the target temperature and slowing the temperature rise, it is possible to suppress the maximum endpoint temperature inside the DPF, thereby preventing the overheating of the DPF. In this manner, the regeneration of the DPF can be performed more safely.

Figure 11:
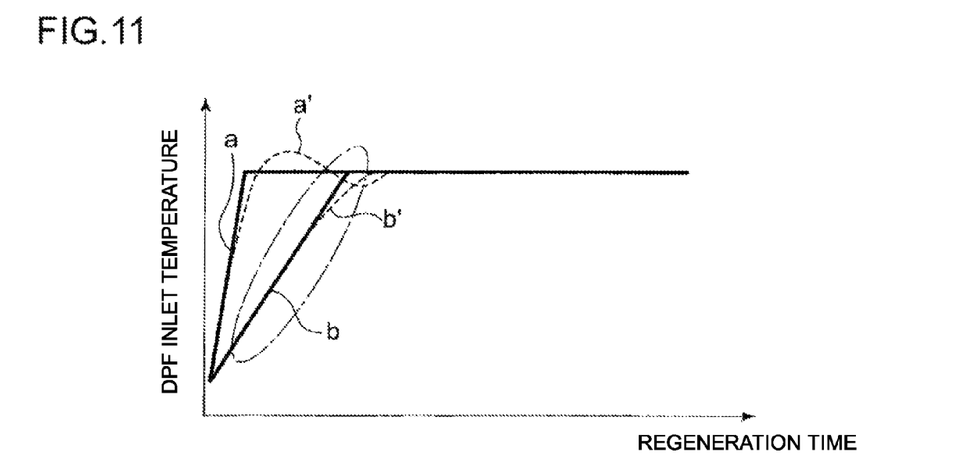
FIG. 11 is a graph showing a relationship between the DPF inlet temperature and elapsed time from initiation of the regeneration.

FIG. 11 is a graph showing a relationship between the DPF inlet temperature and elapsed time from initiation of the regeneration. FIG. 11 shows the DPF inlet temperature on the vertical axis and the elapsed time since the initiation of the regeneration on the horizontal axis.

In FIG. 11, the graph a represents a change in the target speed in the case the rate limit is not applied to the rate of temperature rise, the graph a' represents a change in an actual DPF inlet temperature in the case. Further, the graph b represents a change in the target speed in the case the rate limit is applied to the rate of temperature rise, the graph a' represents a change in an actual DPF inlet temperature in the case. In the case where the rate limit is not applied to the target temperature, it causes overshoot of the actual DPF inlet temperature beyond the target temperature as indicated by the graph a'. In contrast, in the case where the rate limit is applied to the target temperature, there is not overshoot of the actual DPF inlet temperature as indicated by the graph b'.

Therefore, by applying the rate limit to the target temperature to decrease the rate of temperature rise, it is possible to prevent the actual DPF inlet temperature from overshooting beyond the target temperature, thereby allowing for safer regeneration of the DPF against the overheating.

INDUSTRIAL APPLICABILITY

The present invention can be used as an exhaust gas purification apparatus and an exhaust gas purification method for an engine including a filter in an exhaust passage for collecting particulate matter in exhaust gas, which is capable of regenerating the filter without requiring additional parts even when the soot is collected in the filter not less than a certain amount and becomes in the over-accumulation state, as well as a filter regeneration system for the exhaust gas purification apparatus.

The invention claimed is:

1. An exhaust gas purification apparatus for an engine, the apparatus comprising:
   a filter which is arranged in an exhaust passage of the engine and collects particulate matter contained in exhaust gas and in which active regeneration is performed to burn out the collected particulate matter by heating;
   an oxidation catalyst which is arranged upstream of the filter and which is used to heat the filter; and
   a regeneration control unit which performs regeneration of the filter by burning the particulate matters accumulated in the filter,
   wherein the control unit comprises an over-accumulation state determination unit and a switch,
   wherein the over-accumulation state determination unit determines that the particulate matter is over-accumulated in the filter in such a case that:
   the amount of the particulate matter accumulated in the filter becomes not less than a specified amount which is greater than a predetermined amount of a normal regeneration starting condition;
   the amount of the particulate matter accumulated in the filter is less than the specified amount and a specified time has passed since a last regeneration of the filter, the specified time being greater than a predetermined time of the normal regeneration starting condition; or
   the amount of the particulate matter accumulated in the filter is less than the specified amount and an amount of fuel supply reaches a specified supply amount which is greater than a predetermined supply amount of the normal regeneration starting condition,
   wherein the switch switches a regeneration temperature for regenerating the filter between a first regeneration temperature at which a normal regeneration is performed and a second regeneration temperature which is lower than the first regeneration temperature, and
   wherein the control unit is connectable to a command unit, in such a case that the over-accumulation state determination unit determines that the particular matter is over-accumulated in the filter, so that the switch is forcibly operated toward the second regeneration temperature.

2. The exhaust gas purification apparatus for the engine according to claim 1,
   wherein the control unit further comprises an accumulation estimation unit which estimates an amount of the particulate matter accumulated in the filter from an operation state of the engine, and
   wherein the second regeneration temperature is set, in correspondence to the amount of the particulate matter accumulated in the filter, to or below a limit temperature that does not cause over-heating of the filter during the regeneration.

3. The exhaust gas purification apparatus for the engine according to claim 2,
   wherein, in such a case that the over-accumulation state determination unit determines that the particular matter is over-accumulated in the filter, the control unit controls, during the regeneration of the filter, the second regeneration temperature with respect to time in accordance with change of the estimated amount of the particulate matter accumulated in the filter with respect to the time, the estimated amount of the particulate matter being estimated by the accumulation estimation unit.

4. The exhaust gas purification apparatus for the engine according to claim 2,
   wherein the second regeneration temperature is set at a certain value not greater than the limit temperature that does not cause over-heating of the filter during the regeneration in such a case that the amount of the particulate matter collected in the filter is equal to the specified amount which is a criterion for determination by the over-accumulation state determination unit.

5. The exhaust gas purification apparatus for the engine according to claim 2,
   wherein the control unit controls so that the switch is forcibly operated toward the first regeneration temperature in such a case that the over-accumulation state determination unit determines that the particular matter is over-accumulated in the filter and the estimated amount of the particular matter accumulated in the filter which is estimated by the accumulation estimation unit is reduced to or below the specified amount due to the regeneration of the filter, the specified amount being a criterion for determination by the over-accumulation state determination unit.

6. The exhaust gas purification apparatus for the engine according to claim 2, wherein the control unit prohibits the regeneration of the filter when the amount of the particulate matter accumulated in the filter reaches a certain amount greater than the specified amount.

7. An exhaust gas purification method for an engine,
wherein particulate matter contained in exhaust gas is collected by a filter arranged in an exhaust passage of the engine and, when the particulate matter collected in the matter becomes not less than a predetermined amount, the filter is regenerated by injecting fuel at a timing that does not contribute to combustion in a combustion chamber of the engine and burning the particulate matter using an oxidation catalyst,
wherein the particulate matter is determined to be over-accumulated in the filter in such a case that:
the amount of the particulate matter accumulated in the filter becomes not less than a specified amount which is greater than a predetermined amount of a normal regeneration starting condition;
the amount of the particulate matter accumulated in the filter is less than the specified amount and a specified time has passed since a last regeneration of the filter, the specified time being greater than a predetermined time of the normal regeneration starting condition; or
the amount of the particulate matter accumulated in the filter is less than the specified amount and an amount of fuel supply reaches a specified supply amount which is greater than a predetermined supply amount of the normal regeneration starting condition, and
wherein, in such a case that the particulate matter is determined to be over-accumulated, a regeneration temperature for regenerating the filter is set to a second temperature by operating a switch by which the regeneration temperature can be switched between a first regeneration temperature at which a normal regeneration is performed and the second regeneration temperature which is lower than the first regeneration.

8. The exhaust gas purification method for the engine according to claim 7,
wherein the amount of the particulate matter accumulated in the filter is estimated from an operation state of the engine, and
wherein the second regeneration temperature is set, in correspondence to the amount of the particulate matter accumulated in the filter, to or below a limit temperature that does not cause over-heating of the filter during the regeneration.

9. The exhaust gas purification method for the engine according to claim 8,
wherein, in such a case that the particular matter is determined to be over-accumulated in the filter, the second regeneration temperature is changed, during the regeneration of the filter, with respect to time in accordance with change of the amount of the particulate matter accumulated in the filter with respect to the time.

10. The exhaust gas purification method for the engine according to claim 8,
wherein, in such a case that the amount of the particulate matter accumulated in the filter is equal to the specified amount which is a criterion for determining the over-accumulation in the filter, the second regeneration temperature is set at a certain value not greater than the limit temperature that does not cause over-heating of the filter during the regeneration of the filter.

11. The exhaust gas purification method for the engine according to claim 8,
wherein, in such a case that the particular matter is determined to be over-accumulated in the filter and then the amount of the particulate matter accumulated in the filter is reduced to or below the specified amount by regenerating the filter at the second temperature, the switch is forcibly operated toward the first regeneration temperature, the specified amount being a criterion for determining the over-accumulation of the filter.

12. The exhaust gas purification method for the engine according to claim 8,
wherein, in such a case that the filter is regenerated at the second regeneration temperature, the temperature is raised to the second temperature at a rate slower than a rate of raising the temperature to the first temperature to regenerate the filter at the first temperature.

13. The exhaust gas purification method for the engine according to claim 8,
wherein, after the regeneration of the filter at the second regeneration temperature is completed, oil used for the engine is changed.

14. A filter regeneration system regarding an exhaust gas purification apparatus for an engine, the apparatus comprising: a filter which is arranged in an exhaust passage of the engine and collects particulate matter contained in exhaust gas and in which regeneration is performed to burn out the collected particulate matter by heating; an oxidation catalyst which is arranged upstream of the filter and which is used to heat the filter; and a control unit which performs regeneration of the filter by burning the particulate matters accumulated in the filter,
wherein the control unit comprises an over-accumulation state determination unit and a switch,
wherein the over-accumulation state determination unit determines that the particulate matter is over-accumulated in the filter in such a case that:
the amount of the particulate matter accumulated in the filter becomes not less than a specified amount which is greater than a predetermined amount of a normal regeneration starting condition;
the amount of the particulate matter accumulated in the filter is less than the specified amount and a specified time has passed since a last regeneration of the filter, the specified time being greater than a predetermined time of the normal regeneration starting condition; or
the amount of the particulate matter accumulated in the filter is less than the specified amount and an amount of fuel supply reaches a specified supply amount which is greater than a predetermined supply amount of the normal regeneration starting condition,
wherein the switch switches a regeneration temperature for regenerating the filter between a first regeneration temperature at which a normal regeneration is performed and a second regeneration temperature which is lower than the first regeneration temperature,
wherein the filter regeneration system comprises a command unit and a server,
the command unit being connectable to the control unit in such a case that the over-accumulation state determination unit determines that the particulate matter is over-accumulated in the filter and being capable of forcibly operating the switch toward the second regeneration temperature,
the server being capable of communicating with the command unit, and
wherein, when being connected to the control unit, the command unit reads information regarding the engine from the control unit, supplies the information regarding the engine to the server, and transmits to the server such information after completion of the regeneration that the switch is operated to the second regeneration temperature and the regeneration is performed.

15. The filter regeneration system regarding the exhaust gas purification apparatus for the engine according to claim 14,
   wherein the server compares the information regarding the engine supplied from the command unit with a database stored in the server and determines whether or not to permit switching operation of the switch by the command unit, and
   wherein, in a case of allowing the switching operation of the switch, the server transmits permission information to the command unit and the command unit operates the switch based on the permission information from the server.

16. The filter regeneration system regarding the exhaust gas purification apparatus for the engine according to claim 14,
   wherein the command unit, after the regeneration is completed at the second regeneration temperature, displays a message to promote oil change of the engine and, in such a case that the oil is changed based on the displayed message, transmits such information to the server that the oil is changed.

17. The filter regeneration system regarding the exhaust gas purification apparatus for the engine according to claim 14,
   wherein the server is used to charge a user of the command unit a prescribed service fee based on the information transmitted from the command unit.

* * * * *